July 11, 1939.    J. H. LITTLE    2,165,637

ROOF SPEAKER MOUNTING

Filed March 6, 1937

Inventor
John H. Little
By Blackmore, Spencer & Flint
Attorneys

Patented July 11, 1939

2,165,637

UNITED STATES PATENT OFFICE 2,165,637

ROOF SPEAKER MOUNTING

John H. Little, Detroit, Mich., assignor to General Motors Corporation, Detroit, Mich., a corporation of Delaware Application March 6, 1937, Serial No. 129,528

5 Claims. (Cl. 250—16)

This invention relates generally to an automobile radio speaker, and more particularly to the mounting of a speaker unit in the roof of the automobile.

One object of the invention is to provide a mounting of simple construction which will facilitate the installation of the speaker unit.

A further object is to provide a construction and mounting which will provide for a close fit of the edges of the speaker unit with the fabric material or headlining inside the roof.

Other objects and advantages of the present invention will be apparent from the following description of the embodiment illustrated in the accompanying drawing in which.

Figure 1:
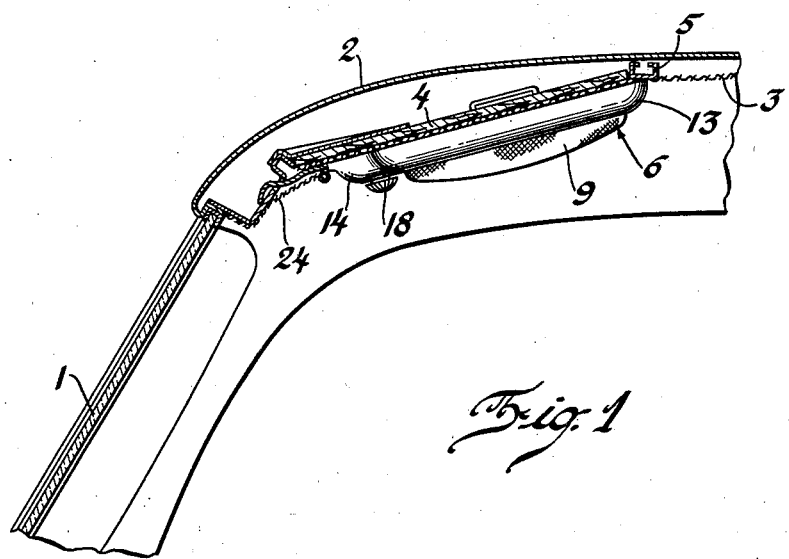
Figure 1 is a diagrammatic side elevation of the speaker installation with adjacent parts of the automobile in cross section.

Referring to the drawing, the automobile body may be generally of conventional construction and include the windshield 1, the metal top or roof 2, the roof fabric material or headlining 3, and a baffle 4 and cross bow 5 between the roof and headlining.

The radio speaker unit, indicated generally at 6, is adapted to be mounted in the present instance inside the roof adjacent the front of the vehicle. No details of the speaker construction per se have been illustrated since it may be of conventional construction, except for the particular location and mounting of the tone control switch 7 as will be hereinafter described.

The speaker 6 includes a dome-shaped casing 8 to house the usual speaker parts and this casing is preferably covered on its outer face by suitable fabric material 9 to enhance the appearance and conceal the usual central opening or grill in the speaker casing.

The casing 8 is formed with an annular flange 10 and is adapted to be directly secured to the baffle 4 and cross bow 5 by the screws 11 passing through the flange 10. On the side which is towards the front of the automobile when installed, the casing 8 is provided with a projecting bracket 12 for mounting the tone control switch 7.

To conceal the flange 10 of the casing 8 and the securing screws 11 and also the bracket 12 and tone control switch 7, an ornamental rim or ring 13 is provided which is attached to the casing 8 in the following manner.

The ring 13 is substantially circular and is formed with an enlargement 14 to house and conceal the tone control switch 7 which is provided with a screw-threaded post 15 adapted to extend through an opening in the enlargement 14 so that the ring 13 may be secured to the casing 8 by a nut 16 on the post 15. The operating shaft 17 for the tone control switch extends through the post 15 and an operating knob 18 may be frictionally or otherwise secured to the end of this shaft after assembly of the ring 13 with the casing 8 so that this knob conceals the securing nut 16.

Figure 2:
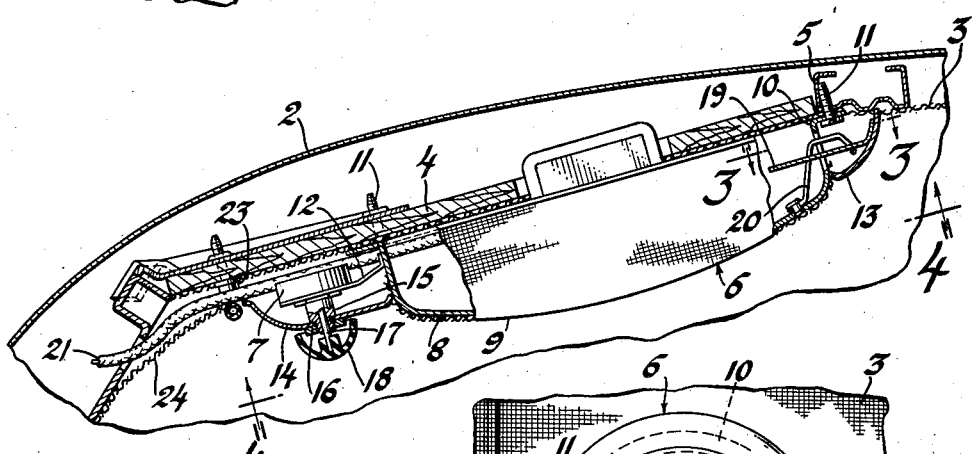
Figure 2 is an enlarged longitudinal cross section of the speaker mounting.
Figure 3:
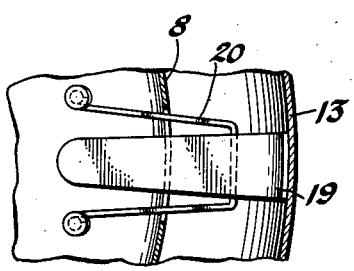
Figure 3 is a detail section taken substantially on line 3—3 of Figure 2.
Figure 4:
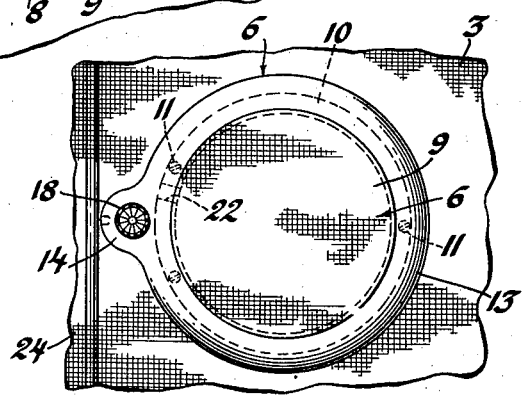
Figure 4 is an elevation of the speaker mounting taken in the direction of the line 4—4 of Figure 2.

At a point diametrically opposite the enlargement 14, the ring 13 is provided with a concealed securing means which is so associated with spring means on the casing 8 as to cause the ring 13 to resiliently engage the fabric material or headlining 3 to form a close fit therewith. Referring to Figures 2 and 3, the ring 13 is provided internally with an inwardly extending arm 19 and the casing 8 is provided with a spring wire loop 20 having an intermediate offset portion which is adapted to be engaged by the arm 19 to exert a yielding upward pressure on the ring 13.

To install the speaker unit, the casing 8 is first secured in place by the screws 11. It will be noted that the casing is preferably located adjacent the front of the vehicle roof so that the cable 21 which extends to the radio chassis may be readily concealed. This cable extends through a slot 22 in the casing 8 and a slot 23 in the end of the enlargement 14 of the ring 13, and may be led to the radio chassis by pulling back a portion of the header trim 24 and passing the cable down through one of the corner pillars of the body frame.

The ring 13 is then assembled with the casing 8 by first engaging the arm 19 over the spring loop 20, and moving the ring forwardly and swinging the front end upwardly until the post 15 extends through the opening in the enlargement 14 whereupon the nut 16 may be applied to secure the front end of the ring to the casing and the operating knob 18 then placed on the shaft 17 to complete the assembly.

It will be noted that the foregoing construction provides for the concealment of the means securing the speaker to the roof and the spring wire loop 20 serves to force the concealing ring 13 upwardly about the post 15 as a fulcrum to engage tightly with the headlining or fabric material 3.

Although but a single embodiment of the invention has been herein shown and described it will be understood that various modifications may be apparent to those skilled in the art which would fall within the scope of the present invention as defined in the following claims.

I claim:

1. In a radio speaker having a substantially dome-shaped speaker casing with an outwardly extending flange whereby said casing may be secured to the roof of an automobile and a ring for concealing said flange detachably secured to said casing, the combination of a tone control switch mounted externally on said casing and an enlargement on said ring for concealing said switch.

2. In a radio speaker having a substantially dome-shaped casing and means to secure said casing to the roof of an automobile adjacent the header trim and a cable adapted to connect said speaker to the radio chassis, with a portion of said cable extending from said speaker casing toward and under said header trim and an ornamental ring detachably connected to said casing, the combination of a tone control switch mounted externally on said casing and a lateral enlargement on said ring extending over and concealing said tone control switch and the portion of said cable between said casing and said header trim.

3. In a radio speaker having a substantially dome-shaped casing and a ring surrounding and resiliently secured to said casing, a tone control switch mounted externally on said casing, said ring covering said switch, means for securing said ring to said switch and operating means for said switch extending through said ring and adapted to conceal said securing means.

4. The elements set forth in claim 1 in which said means consists of a connection of said ring to said tone control switch with operating means for said switch extending through said ring, and a yielding connection between said ring and said casing which is adapted to force said ring upwardly about said first mentioned connection to engage with the automobile roof.

5. In a radio speaker mounting for automobiles having a substantially dome-shaped speaker casing, means to secure said casing to the roof of an automobile and a ring surrounding said casing, the combination of a tone control switch mounted externally on said casing, said ring having means for concealing said switch, means for fastening said ring detachably to said casing and actuating means for said switch concealing said fastening means.

JOHN H. LITTLE.